A. L. R. ELLIS.
ELECTRICAL APPARATUS.
APPLICATION FILED JULY 8, 1915.
1,232,253.
Patented July 3, 1917.
2 SHEETS—SHEET 2.
Fig. 7.
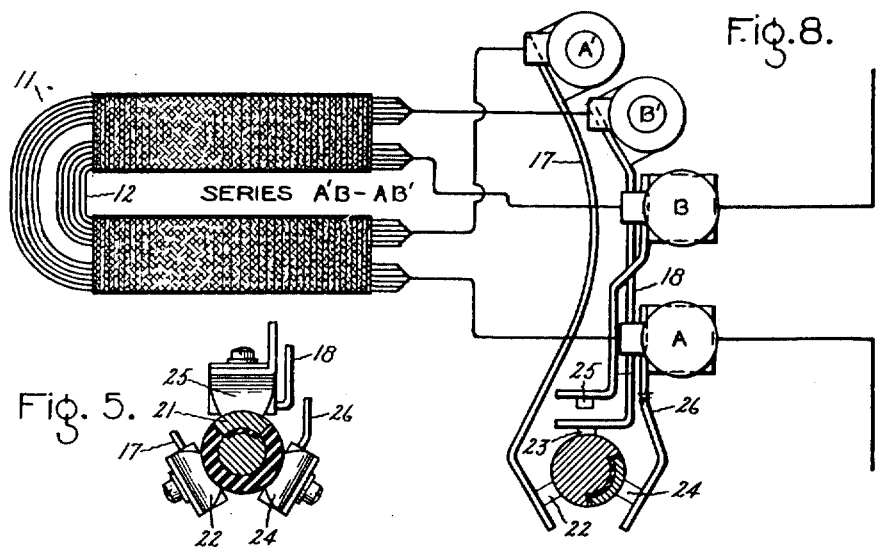
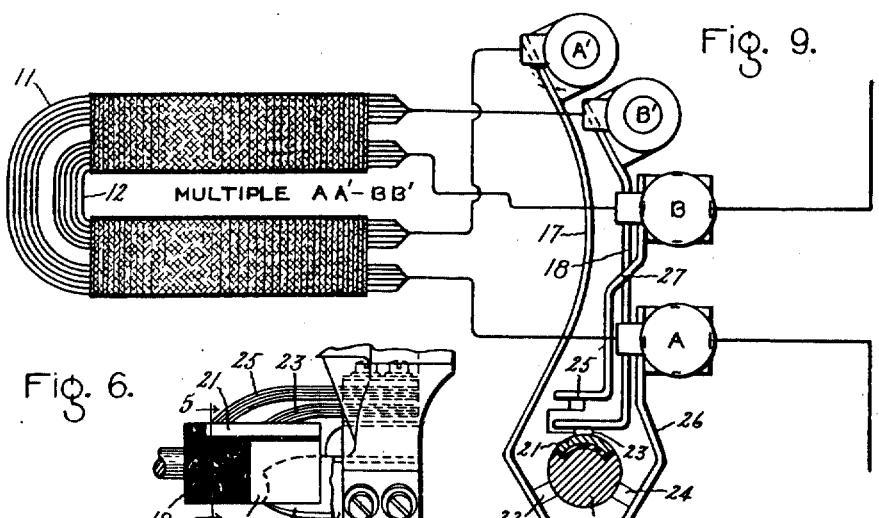
Witnesses:
Helen Beford
Margaret E. Thooley
Inventor,
Alvarado L. R. Ellis,
by
Albert G. Davis
Att'y.

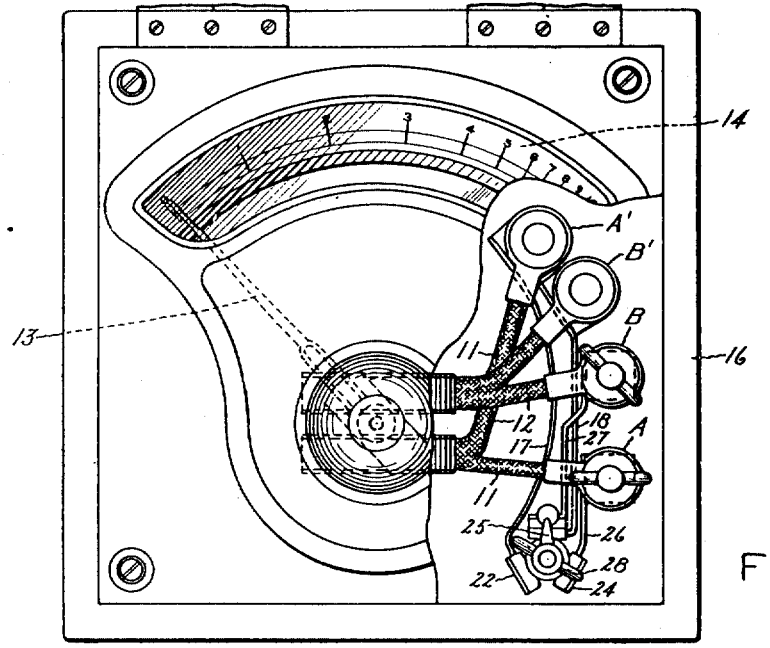
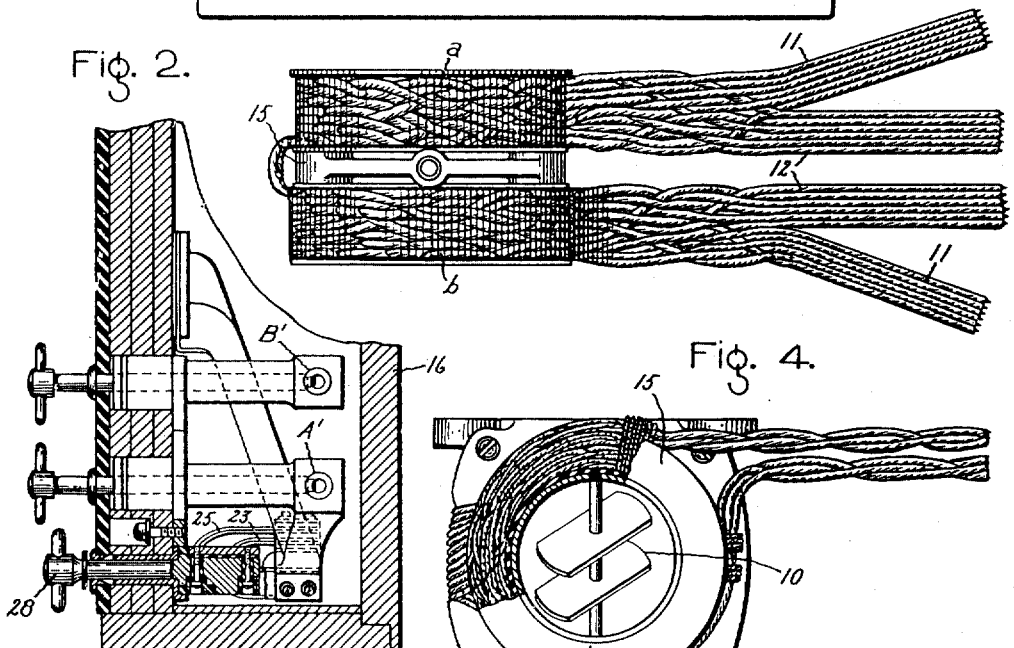

UNITED STATES PATENT OFFICE.

ALVARADO L. R. ELLIS, OF LYNN, MASSACHUSETTS, ASSIGNOR TO GENERAL ELECTRIC COMPANY, A CORPORATION OF NEW YORK.

ELECTRICAL APPARATUS.

1,232,253.      Specification of Letters Patent.      Patented July 3, 1917.

Application filed July 8, 1915. Serial No. 38,711.

*To all whom it may concern:*

Be it known that I, ALVARADO L. R. ELLIS, a citizen of the United States, residing at Lynn, county of Essex, State of Massachusetts, have invented certain new and useful Improvements in Electrical Apparatus, of which the following is a specification.

My invention relates to electrical apparatus and in particular to electrical instruments having two or more coils or windings adapted to be connected in series, or parallel, or series-parallel, for varying the effect or range of the apparatus or instrument. Electrical measuring instruments are frequently provided with two or more coils inductively related to a relatively movable element or coil for the purpose of varying the range of the instrument by connecting the first-mentioned coils in series or parallel. These coils usually consist of a plurality of conductor turns, and for accurate results it is essential that the magnetic effects of the conductors of these coils be equally distributed with respect to the relatively movable element. The object of my invention is to provide a novel and improved arrangement of the conductors of two or more coils for obtaining equal magnetic effects from the coils. More particularly the object of my invention is to provide a novel and improved electrical measuring instrument having two or more coils adapted for series or parallel connection inductively related to an armature element in which the magnetic effects of the coils are equally distributed.

The novel features which I believe to be patentably characteristic of my invention are definitely indicated in the claims appended hereto. The principle of my invention and its application to an electrical measuring instrument will be understood from the following description taken in connection with the accompanying drawings, in which:

Figure 1 is a plan view partly in section of an electrical measuring instrument embodying the features of my present invention; Fig. 2 is a side elevation of the switch and binding posts of the instrument; Fig. 3 is a plan view of the instrument coils; Fig. 4 is a front elevation partly in section of the instrument coils; Figs. 5 and 6 are detail views of the switch, Fig. 5 being a section on the line 5—5 of Fig. 6; Fig. 7 is a view of the braided or woven conductor structure employed in the stationary coils of the instrument; and Figs. 8 and 9 are diagrammatic views of the two operative connections of the stationary coils.

The instrument illustrated in the accompanying drawings for the purpose of explaining my invention is an ammeter comprising a pivotally mounted armature 10 inductively related to two stationary coils 11 and 12 adapted to be connected in series or parallel for varying the capacity of the instrument. A pointer or indicating needle 13 is secured to the shaft of the armature element 10 and is adapted to sweep across a suitable scale 14. Each stationary coil 11 and 12 consists of a plurality of conductors or strands connected in multiple. All of the conductors or strands of both coils are intimately mixed or interwoven by braiding the strands, as illustrated in Fig. 7 of the drawings. One of the strands is represented by a solid black line in Fig. 7 in order to show the general character of the interweaving or braiding. It will be observed by reference to Fig. 3 of the drawings, that each coil 11 and 12 consists of six strands. The twelve strands of the two coils are braided or interwoven in any suitable manner in order to thoroughly mix the strands so that the magnetic effect of each strand of the two coils is equally distributed with respect to the armature. The result is a flat braided structure in which each strand or conductor is threaded back and forth across the entire width of the braided structure, as clearly shown in Fig. 7. Thus, instead of using for each coil a single conductor of the required current-carrying capacity, I employ a plurality of conductors or strands, and intimately distribute the magnetic effects of these strands by thoroughly mixing the strands together.

All of the conductors of the two coils are woven together and wound as a single unit upon a suitable support 15, as indicated in Figs. 3 and 4 of the drawings. As is usual in instruments of this type, the support 15 is designed so that the stationary winding or element is composed of two sections *a* and *b* symmetrically positioned with respect to the armature. It will be noted that the width of the braided conductor structure is the same as that of the coil sections *a* and *b*. The stationary element of the instrument thus consists in effect of a plurality of conductors intimately woven together and divided into two groups. The terminals of the two groups of conductors, that is to say the terminals of the two coils 11 and 12, are brought out to binding posts A—B′ and A′—B, respectively. The binding posts A and B extend without the instrument casing 16, and serve to connect the instrument into the electric circuit whose current flow is to be measured. The binding posts A′ and B′ are positioned within the instrument casing and are electrically connected to a switching device by two contact strips or arms 17 and 18, respectively. The switching device comprises a rotatable drum 19 having two contacts 20 and 21. Three contact brushes 22, 23 and 24 are operatively related to the contact 20. Contact brushes 22 and 23 are secured to the arms 17 and 18, respectively, while the brush 24 is secured to a contact strip 26 electrically connected to the binding post A. A fourth contact brush 25 is electrically connected to the binding post B by a contact strip 27, and is adapted to be electrically connected to the contact brush 23 by the contact 21 of the switch.

The switch drum is turned by a handle 28 extending outside the instrument casing. In one operative position of the switch drum, the contact brushes 22 and 23 are electrically connected by the contact 20, and the coils 11 and 12 are connected in series, as diagrammatically indicated in Fig. 8 of the drawings. In the other operative position of the drum, contact brushes 22 and 24 are electrically connected by the contact 20, while contact brushes 23 and 25 are electrically connected by the contact 21, and the coils 11 and 12 are connected in parallel, as diagrammatically illustrated in Fig. 9 of the drawings.

It will be evident from the foregoing description that in accordance with my present invention each strand of each of the two stationary coils is threaded back and forth across the entire coil width, so that the magnetic effects of the conductors of the coils are equally distributed with respect to the armature element. It will be understood that the magnetic effect upon the armature element of a conductor near the inside of a coil section is greater than that of a conductor at the outside of a coil section. My novel braided conductor structure carries every conductor or strand of each coil from the outside to the inside of the coil width many times, and each conductor is thus well distributed over the entire coil width, so that the magnetic effect of each conductor upon the armature element is substantially the same. Thus, when the connections of the coils are varied to change the range of the instrument, the magnetic effects of the conductors of the coils will be relatively the same, since every conductor of both coils is equally distributed over the coil width.

What I claim as new and desire to secure by Letters Patent of the United States, is,—

1. An alternating current electrical measuring instrument comprising a movable armature, two stationary coils inductively related to said armature, each of said coils comprising a plurality of conductors, all of the conductors of both coils being interwoven to equally distribute the magnetic effects of the conductors with respect to said armature, and means for connecting said coils in series or in parallel.

2. An alternating current electrical measuring instrument comprising a movable armature, a plurality of conductors woven together and wound as a substantially unitary element inductively related to said armature, said conductors being divided into a plurality of groups to form in effect a plurality of individual coils, and means for connecting said groups of conductors in series or in parallel.

3. An alternating current electrical apparatus comprising in combination two coils inductively related to a third element, each of said coils consisting of a plurality of conductors, all of the conductors of both coils being woven together and wound as a single unit so that the magnetic effects of the conductors are equally distributed with respect to said third element, and means for connecting said coils in series or in parallel.

4. An alternating current electrical measuring instrument comprising a movable armature, a stationary element inductively related to said armature and consisting of a plurality of conductors intimately woven together and divided into a plurality of groups, and means for connecting said groups of conductors in series or in parallel.

5. An alternating current electrical apparatus including a winding consisting of a plurality of conductors woven together and wound as a substantially unitary element, said conductors being divided into a plurality of groups to form in effect a plurality of individual coils, and means for connecting said groups of conductors in series or in parallel for varying the magnetic effect of said winding.

In witness whereof, I have hereunto set my hand this sixth day of July, 1915.

ALVARADO L. R. ELLIS.